(12) United States Patent
Harada

(10) Patent No.: US 8,128,862 B2
(45) Date of Patent: Mar. 6, 2012

(54) BLAST FURNACE GAS BURNING FACILITY AND METHOD FOR OPERATING THE SAME

(75) Inventor: Shoichi Harada, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 298 days.

(21) Appl. No.: 12/525,609

(22) PCT Filed: Jul. 4, 2008

(86) PCT No.: PCT/JP2008/062184
§ 371 (c)(1),
(2), (4) Date: Aug. 3, 2009

(87) PCT Pub. No.: WO2009/005146
PCT Pub. Date: Jan. 8, 2009

(65) Prior Publication Data
US 2009/0315230 A1    Dec. 24, 2009

(30) Foreign Application Priority Data
Jul. 4, 2007    (JP) .................................. 2007-176517

(51) Int. Cl.
C21B 7/22    (2006.01)
(52) U.S. Cl. ............................ 266/44; 266/156; 266/157
(58) Field of Classification Search .................... 266/44, 266/144, 156, 157
See application file for complete search history.

(56) References Cited

U.S. PATENT DOCUMENTS 4,085,008 A * 4/1978 Kinzler ......................... 202/151

FOREIGN PATENT DOCUMENTS

| JP | 9-79046 A | 3/1997 |
| JP | 9-317499 A | 12/1997 |
| JP | 2004-316534 A | 11/2004 |
| JP | 2007-023976 A | 2/2007 |

OTHER PUBLICATIONS

International Search Report of PCT/JP2008/062184, date of mailing Aug. 12, 2008.

* cited by examiner

*Primary Examiner* — Scott Kastler
(74) *Attorney, Agent, or Firm* — Westerman, Hattori, Daniels & Adrian, LLP

(57) ABSTRACT

The blast furnace gas burning facility prevents a wet type dust collector from freezing under such conditions that the temperature of blast furnace gas does not exceed the freezing lower-limit temperature of the wet type dust collector. The blast furnace gas burning facility 1 burns blast furnace gas discharged from a blast furnace by supplying the gas to a combustor 2 after removing dust with a wet type dust collector 7 and compressing the gas with a compressor 8. A fuel-gas heating channel 12 is disposed between the outlet side of the compressor and the inlet side of the wet type dust collector. When the temperature of the blast furnace gas flowing into the wet type dust collector is lower than a lower limit temperature, a high-temperature, high-pressure gas compressed by the compressor is diverged and supplied into the inlet side of the wet type dust collector.

3 Claims, 1 Drawing Sheet

BLAST FURNACE GAS BURNING FACILITY AND METHOD FOR OPERATING THE SAME

TECHNICAL FIELD

The present invention relates to blast furnace gas burning facilities using blast furnace gas discharged from a blast furnace as a fuel gas and also to methods for operating the facilities.

BACKGROUND ART

Blast furnace gas is a gas generated when iron ore is molten to produce pig iron and is used as a fuel gas in blast furnace gas burning gas turbine power generation plants because it contains flammable components. However, because blast furnace gas is typically a low-calorific gas, the gas is often used not alone but as a mixture with, for example, coke oven gas (COG) so that its calorific value can be increased to the level required for burning in gas turbines. Because this calorie-increasing gas has low pressure, a fuel gas compressor is provided in a fuel-gas supply channel leading to a gas turbine combustor so that the gas can be supplied to the gas turbine combustor while being compressed to a high pressure.

On the other hand, because blast furnace gas contains dust, such as iron oxide, and corrosive gas components, the dust is removed by providing a dust collector, such as an electrostatic dust collector, upstream of the fuel gas compressor in the fuel-gas supply channel for supplying blast furnace gas from a blast furnace to a gas turbine facility. Because blast furnace gas contains a large amount of dust, the dust collector used is a wet type dust collector capable of washing away the corrosive gas components together with the collected dust by spraying water.

Patent Document 1 discloses an example of such a blast furnace gas burning gas turbine facility that burns blast furnace gas discharged from a blast furnace by supplying the gas to a combustor after removing a large amount of dust contained in the gas with a wet type dust collector and compressing the gas with a fuel gas compressor. In the facility disclosed in Patent Document 1, excess fuel gas discharged from the fuel gas compressor during low-load operation is returned to the inlet side of the dust collector via a flow control valve and a fuel gas cooler.

Patent Document 1:
Japanese Unexamined Patent Application, Publication No. HEI-9-79046

DISCLOSURE OF INVENTION

In the case where the dust collector used is a wet type dust collector of the type that washes away collected dust by spraying water, if the gas supply temperature of blast furnace gas falls below 0° C., it is difficult to spray water because of freezing, and it is therefore impossible to safely operate a gas turbine. In cold climates, particularly, if a blast furnace and a gas turbine power generation plant are installed away from each other, a noticeable decrease occurs in the temperature of blast furnace gas due to heat dissipation from a gas pipeline for conveying the blast furnace gas at low outside air temperatures, thus resulting in a situation where the temperature of the blast furnace gas flowing into the dust collector falls below 0° C.

The facility disclosed in Patent Document 1 mentioned above includes a recirculation channel for returning high-temperature, high-pressure excess gas from the outlet of the fuel gas compressor to the inlet side of the dust collector via the flow control valve and the fuel gas cooler, which are controlled depending on the load on the gas turbine. However, this recirculation channel is intended to recirculate the excess portion of fuel gas that increases and decreases depending on the load on the gas turbine and is constituted of a large-diameter pipe capable of returning the full amount at maximum capacity. Therefore, even if a small amount of gas is returned during high-load operation, where the amount returned is low, it is difficult to control the gas temperature; therefore, this system does not serve as a solution to the above problem.

An object of the present invention, which has been made in light of the above circumstances, is to provide a blast furnace gas burning facility with a simple configuration and capable of operating at nearly rated load while preventing a wet type dust collector from freezing under such conditions that the temperature of blast furnace gas does not exceed the freezing lower-limit temperature of the wet type dust collector, and also to provide a method for operating the facility.

To solve the above problem, the blast furnace gas burning facility and the method for operating the facility of the present invention employ the following solutions.

That is, a blast furnace gas burning facility according to a first aspect of the present invention is a blast furnace gas burning facility that burns blast furnace gas discharged from a blast furnace by supplying the gas to a combustor after removing dust contained in the gas with a wet type dust collector and compressing the gas with a fuel gas compressor, and a fuel-gas heating channel is disposed between the outlet side of the fuel gas compressor and the inlet side of the wet type dust collector or the wet type dust collector to supply a high-temperature, high-pressure gas compressed by the fuel gas compressor to the inlet side of the wet type dust collector or into the wet type dust collector if the temperature of the blast furnace gas flowing into the wet type dust collector is detected and the temperature does not exceed a predetermined temperature.

In a blast furnace gas burning facility, particularly, in cold climates, if a blast furnace and the blast furnace gas burning facility are installed away from each other, the temperature of gas supplied from the blast furnace at a low outside air temperature can fall below 0° C. due to heat dissipation from a gas pipeline; in this case, it is impossible to spray water for washing away dust collected by a wet type dust collector, and it is therefore difficult to operate the blast furnace gas burning facility in a steady state. In the first aspect of the present invention, because the fuel-gas heating channel is disposed between the outlet side of the fuel gas compressor and the inlet side of the wet type dust collector or the wet type dust collector to supply the high-temperature, high-pressure gas compressed by the fuel gas compressor, the temperature of the blast furnace gas flowing into the wet type dust collector is detected, and the high-temperature, high-pressure gas compressed by the fuel gas compressor is supplied to the inlet side of the wet type dust collector or into the wet type dust collector, the temperature of the blast furnace gas supplied into the wet type dust collector can be maintained at or above the freezing lower-limit temperature of the wet type dust collector by mixing the high-temperature, high-pressure gas from the fuel gas compressor through the fuel-gas heating channel even if the temperature of the blast furnace gas does not exceed the freezing lower-limit temperature due to heat dissipation from a pipeline. This allows the blast furnace gas burning facility to operate at nearly rated load by minimizing the amount of gas extracted from the gas discharged from the fuel gas compressor during operation at a low outside air temperature, at which partial load operation would normally be required.

In addition, a method for operating a blast furnace gas burning facility according to a second aspect of the present invention is a method for operating a blast furnace gas burning facility that burns blast furnace gas discharged from a blast furnace by supplying the gas to a combustor after removing dust contained in the gas with a wet type dust collector and compressing the gas with a fuel gas compressor, and, if the temperature of the blast furnace gas flowing into the wet type dust collector does not exceed a predetermined temperature, a high-temperature, high-pressure gas compressed by the fuel gas compressor is supplied to the inlet side of the wet type dust collector or into the wet type dust collector to heat the blast furnace gas flowing into the wet type dust collector, thereby maintaining the temperature of the blast furnace gas flowing into the wet type dust collector at or above a freezing lower-limit temperature.

In the second aspect of the present invention, if the temperature of the blast furnace gas supplied from the blast furnace is decreased by heat dissipation from a pipeline to the freezing lower-limit temperature of water sprayed in the wet type dust collector or below, the high-temperature, high-pressure gas compressed by the fuel gas compressor is supplied to the inlet side of the wet type dust collector or into the wet type dust collector to heat the blast furnace gas flowing into the wet type dust collector, thereby maintaining the temperature at or above the freezing lower-limit temperature. This allows the blast furnace gas burning facility to operate at nearly rated load by minimizing the amount of gas extracted from the gas discharged from the fuel gas compressor during operation at a low outside air temperature, at which partial load operation would normally be required.

In addition, according to a method of the present invention for operating a blast furnace gas burning facility, in the above method for operating the blast furnace gas burning facility, the amount of high-temperature, high-pressure gas extracted for heating may be controlled by feedforward control system with detecting the temperature of the blast furnace gas flowing into the wet type dust collector and the flow rate of the blast furnace gas.

In this operation method, because the amount of high-temperature, high-pressure gas extracted for heating is not only controlled by detecting the temperature of the blast furnace gas flowing into the wet type dust collector so that it can be reliably controlled at or above the freezing lower-limit temperature by feedback control, but also is subjected to feedforward control using the flow rate of the blast furnace gas as a parameter, the amount of high-temperature, high-pressure gas extracted for heating can be appropriately controlled without a delay in response even if the amount of blast furnace gas supplied varies greatly. Thus, the temperature of the blast furnace gas flowing into the wet type dust collector can be reliably controlled to the freezing lower-limit temperature or above.

The blast furnace gas burning facility of the present invention can maintain the temperature of the blast furnace gas supplied into the wet type dust collector at or above the freezing lower-limit temperature of the wet type dust collector at such a low outside air temperature that the temperature of the blast furnace gas does not exceed the freezing lower-limit temperature, by mixing some of the high-temperature, high-pressure gas discharged from the fuel gas compressor through the fuel-gas heating channel. This allows the blast furnace gas burning facility to operate at nearly rated load by minimizing the amount of gas extracted from the gas discharged from the fuel gas compressor during operation at a low outside air temperature, at which partial load operation would normally be required. In addition, means for preventing freezing of the wet type dust collector can be provided at low cost with a simple configuration.

In addition, in the method of the present invention for operating the blast furnace gas burning facility, if the temperature of the blast furnace gas supplied from the blast furnace is decreased to the freezing lower-limit temperature of water sprayed in the wet type dust collector or below, some of the high-temperature, high-pressure gas compressed by the fuel gas compressor is extracted for heating to the inlet side of the wet type dust collector or into the dust collector to heat the blast furnace gas flowing into the wet type dust collector, thereby maintaining the temperature at or above the freezing lower-limit temperature. This allows the blast furnace gas burning facility to operate at nearly rated load by minimizing the amount of gas extracted from the gas discharged from the fuel gas compressor during operation at a low outside air temperature, at which partial load operation would normally be required.

EXPLANATION OF REFERENCE SIGNS

Figure 1:
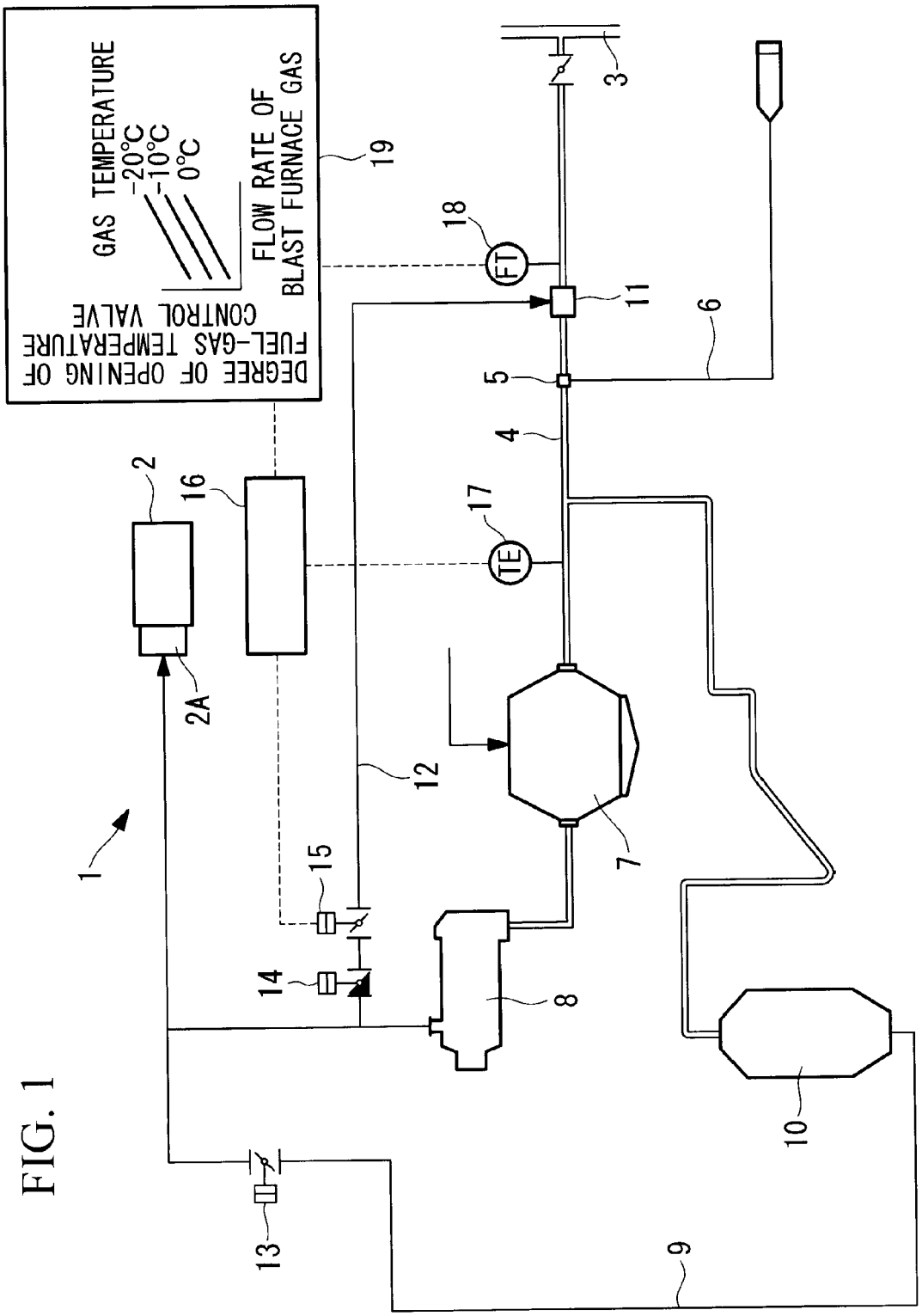
FIG. 1 is a system diagram of a blast furnace gas burning gas turbine facility according to a first embodiment of the present invention.

1: blast furnace gas burning gas turbine facility (blast furnace gas burning facility)
2: blast furnace gas burning gas turbine
2A: combustor
3: main gas line
4: gas pipeline
5: mixer
6: COG supply line
7: wet type dust collector
8: fuel gas compressor
12: fuel-gas heating line (fuel-gas heating channel)
13: gas flow control valve
14: shutoff valve
15: fuel-gas temperature control valve
16: control unit
17: gas temperature sensor
18: flow-rate detecting sensor

BEST MODE FOR CARRYING OUT THE INVENTION

Embodiments of the present invention will now be described with reference to the drawing.

First Embodiment

A first embodiment of the present invention will be described below using FIG. 1.

FIG. 1 shows a system diagram of a blast furnace gas burning gas turbine facility according to the first embodiment of the present invention.

A blast furnace gas burning gas turbine facility 1 according to this embodiment includes a blast furnace gas burning gas turbine 2 including a gas turbine combustor 2A; a main gas line 3 for supplying blast furnace gas from a blast furnace (not shown); a gas pipeline 4 for supplying the blast furnace gas as a fuel gas from the main gas line 3 to the combustor 2A of the blast furnace gas burning gas turbine 2; a COG supply line 6 for mixing a high-calorific coke oven gas (COG) into the blast furnace gas supplied from the blast furnace via a mixer 5; a wet type dust collector 7 disposed in the gas pipeline 4 and constituted of a wet type electrostatic dust collector; a fuel gas compressor 8 disposed in the gas pipeline 4 downstream of the wet type dust collector 7 and constituted of a constant volume axial compressor; a recirculation line 9 for recirculating high-temperature, high-pressure fuel gas discharged from the fuel gas compressor 8 to the inlet side of the wet type dust collector 7 depending on the load on the blast furnace gas burning gas turbine 2; a gas cooler 10 disposed in the recirculation line 9; and a fuel-gas heating line 12 for extracting some of the high-temperature, high-pressure fuel gas discharged from the fuel gas compressor 8 and mixing the fuel gas into the blast furnace gas in the gas pipeline 4 via a fuel-gas heating mixer 11 upstream of the wet type dust collector 7 if the temperature of the blast furnace gas flowing into the wet type dust collector 7 does not exceed the freezing lower-limit temperature of the wet type dust collector 7, for example, 5° C.

The gas pipeline 4, some times, have a pipe diameter of more than 3 m for some plants to ensure a sufficient flow rate because blast furnace gas is a low-calorific gas, and usually has no heat insulation; therefore, if the blast furnace and the blast furnace gas burning gas turbine 2 are installed away from each other and the gas pipeline 4 is correspondingly long, the temperature of the high-temperature blast furnace gas is decreased to close to the outside air temperature by heat radiation during transportation. In cold climates, particularly, the outside air temperature is lower than 0° C., in that case, the temperature of the blast furnace gas in the gas pipeline 4 may fall below 0° C.

Because dust must be removed from the blast furnace gas with high efficiency, the dust collector 7 may be a wet type dust collector of the typified one that collects dust ionized by a high voltage on an electrode plate and that washes away the collected dust by spraying water. While other types of wet type dust collectors 7 are available, the wet type dust collector 7 using water spray cannot work if water freezes at an ambient temperature of 0° C. or below. It is therefore necessary to maintain the temperature of the blast furnace gas flowing into the wet type dust collector 7 at or above the freezing lower-limit temperature of the wet type dust collector 7 so that water does not freeze. The freezing lower-limit temperature is set to, for example, 5° C.

The fuel gas compressor 8 compresses the low-pressure blast furnace gas from which dust has been removed into a high-temperature, high-pressure fuel gas at about 400° C. and supplies it to the combustor 2A of the blast furnace gas burning gas turbine 2. The fuel gas compressor 8 used is a constant volume axial compressor. Axial compressors have a wide surging region and therefore cause surging unless they operate at a flow rate of 50% to 60% or more. Hence, when the gas turbine load is low, so the amount of fuel gas supplied to the gas turbine 2 may be small, the fuel gas compressor 8 operates within such a range that no surging occurs, and excess fuel gas is returned to the gas pipeline 4 upstream of the fuel gas compressor 8 through the recirculation line 9. Here the excess fuel gas is returned to the upstream side of the wet type dust collector 7, where dust is removed again, and is sufficiently mixed in the wet type dust collector 7 with the original blast furnace gas coming from the gas pipeline 4 so that the fuel gas has no variations in calorific value when supplied to the gas turbine 2.

The recirculation line 9 has a gas flow control valve 13 controlled depending on the load on the blast furnace gas burning gas turbine 2 so that the amount of fuel gas extracted and recirculated to the recirculation line 9 side can be controlled. The excess fuel gas returned to the gas pipeline 4 through the recirculation line 9 is cooled by the gas cooler 10 and, after the temperature thereof is decreased, is returned and recirculated to the gas pipeline 4 upstream of the wet type dust collector 7. Although the recirculation line 9 is constituted of a large-diameter pipe capable of recirculating the full amount, the amount recirculated is negligibly low during rated operation. In such a situation, it is impossible to control the dust collector inlet gas temperature using this line.

The fuel-gas heating line 12, on the other hand, is disposed between the downstream side (outlet side) of the fuel gas compressor 8 and the upstream side (inlet side) of the wet type dust collector 7. This fuel-gas heating line 12 extracts some of the high-temperature, high-pressure fuel gas discharged from the fuel gas compressor 8 and mixes the fuel gas into the blast furnace gas in the gas pipeline 4 upstream of the wet type dust collector 7, thereby heating the blast furnace gas. The fuel-gas heating line 12 includes a shutoff valve 14 for shutting off the fuel-gas heating line 12 and a fuel-gas temperature control valve 15 for controlling the temperature of the blast furnace gas flowing into the wet type dust collector 7. The fuel-gas heating line 12 may be constituted of a small-diameter pipe with sufficient heat insulation because it is exclusively used for extraction for heating.

The shutoff valve 14 and the fuel-gas temperature control valve 15 are controlled by a control unit 16. A gas temperature sensor 17 disposed in the gas pipeline 4 on the inlet side of the wet type dust collector 7 inputs a detected value to the control unit 16. If the blast furnace gas temperature at the inlet of the wet type dust collector 7 approaches 5° C., the control unit 16 opens the shutoff valve 14 and activates the fuel-gas temperature control valve 15. The control unit 16 thus executes feedback control of the degree of opening of the fuel-gas temperature control valve 15 so that the blast furnace gas temperature at the inlet of the wet type dust collector 7 is maintained at 5° C., thus controlling the amount of high-temperature, high-pressure combustion gas extracted and mixed into the blast furnace gas.

The gas pipeline 4 also includes a flow-rate detecting sensor 18 for detecting the flow rate of the blast furnace gas. The control unit 16 is configured so that, based on a detected value from the flow-rate detecting sensor 18, it executes feedforward control of the degree of valve opening of the fuel-gas temperature control valve 15 to a degree of opening that is set in advance in association with gas temperature by a setting unit 19, depending on the amount of blast furnace gas supplied during, for example, starting or stopping of the blast furnace gas burning gas turbine 2, when the amount of blast furnace gas varies greatly. This prevents a delay in response when the amount of blast furnace gas supplied varies greatly. In addition, it is possible to select feedforward control based on variations in gas turbine output or power generator output.

With the configuration described above, this embodiment provides the following effects and advantages.

The blast furnace gas is mixed with the coke oven gas from the COG supply line 6 through the gas pipeline 4 and flows into the wet type dust collector 7, which removes dust from the blast furnace gas. The blast furnace gas cleaned by the wet type dust collector 7 is taken into and compressed by the fuel gas compressor 8 and is discharged as a high-temperature, high-pressure fuel gas. The fuel gas is supplied into the combustor 2A of the blast furnace gas burning gas turbine 2 and is burned as a drive source for the gas turbine 2. The fuel gas is supplied to the combustor 2A in an amount depending on the load on the blast furnace gas burning gas turbine 2. In addition, excess fuel gas flows to the recirculation line 9 side via the gas flow control valve 13, which is controlled depending on the load on the blast furnace gas burning gas turbine 2, is cooled by the gas cooler 10, and is returned and recirculated into the gas pipeline 4 upstream of the wet type dust collector 7.

If the temperature of the blast furnace gas in the gas pipeline 4 is decreased to close to the freezing lower-limit temperature of the wet type dust collector 7 (for example, 5° C.) by heat radiation to outside air of low temperature, that temperature is detected and input to the control unit 16 by the gas temperature sensor 17. In this case, the control unit 16 opens the shutoff valve 14 of the fuel-gas heating line 12 and activates the fuel-gas temperature control valve 15. The control unit 16 thus controls the degree of opening of the fuel-gas temperature control valve 15 so that the blast furnace gas temperature at the inlet of the wet type dust collector 7 does not fall below 5° C., thus extracting the high-temperature, high-pressure fuel gas to an amount corresponding to that degree of opening from the outlet of the fuel gas compressor 8 into the fuel-gas heating line 12. The high-temperature, high-pressure fuel gas is mixed with the blast furnace gas in the gas pipeline 4 via the mixer 11 to heat the blast furnace gas.

As a result, the temperature of the blast furnace gas flowing into the wet type dust collector 7 can be constantly maintained at or above the freezing lower-limit temperature of the wet type dust collector 7, thus preventing freezing of water sprayed in the wet type dust collector 7, so that the wet type dust collector 7 can operate normally and continuously. This allows the blast furnace gas burning gas turbine 2 to operate at nearly rated load by minimizing the amount of gas extracted from the gas discharged from the fuel gas compressor 8 without concern for freezing of the wet type dust collector 7 during operation at a low outside air temperature, at which partial load operation would normally be required. In addition, means for preventing freezing of the wet type dust collector 7 can be provided at low cost with a simple configuration.

In addition, because feedforward control is executed by detecting the flow rate of the gas supplied from the blast furnace with the flow rate sensor 18 and controlling the degree of opening of the fuel-gas temperature control valve 15 to a degree of opening that is set in advance by the setting unit 19 based on the detected value, the amount of high-temperature, high-pressure gas extracted can be appropriately controlled without a delay in response even if the amount of blast furnace gas supplied varies greatly during, for example, starting or stopping of the gas turbine 2. Thus, the temperature of the blast furnace gas flowing into the wet type dust collector 7 can be reliably controlled to the freezing lower-limit temperature or above.

In addition, the shutoff valve 14 is provided in the fuel-gas heating line 12 so that it can reliably shut off the fuel-gas heating line 12 when the high-temperature, high-pressure gas does not have to be extracted. This prevents extraction of the high-temperature, high-pressure gas compressed by the fuel gas compressor 8 due to unwanted leakage, thus suppressing compression loss.

Although the fuel-gas heating line 12 is connected to the gas pipeline 4 upstream of the mixer 5 in this embodiment, the connecting position is not limited thereto, and it may be connected to any position upstream of the wet type dust collector 7.

Second Embodiment

Next, a second embodiment of the present invention will be described.

This embodiment differs from the first embodiment described above in the connecting position of the fuel-gas heating line 12. The other points are similar to those of the first embodiment, and a description thereof will therefore be omitted.

In this embodiment, the fuel-gas heating line 12 is directly connected to the wet type dust collector 7 to directly supply the high-temperature, high-pressure fuel gas into the wet type dust collector 7.

Thus, effects and advantages similar to those of the first embodiment can also be achieved even if the high-temperature, high-pressure fuel gas extracted through the fuel-gas heating line 12 is directly supplied into the wet type dust collector 7 and mixed with the blast furnace gas to heat them. In this case, with the gas temperature sensor 17 remaining in the gas pipeline 4, another temperature sensor may be disposed in the wet type dust collector 7 to confirm that the wet type dust collector 7 is maintained at or above the freezing lower-limit temperature, or the gas temperature sensor 17 may be relocated to the wet type dust collector 7.

The present invention is not limited to the inventions according to the above embodiments; modifications are permitted so far as not departing from the spirit thereof. In the present invention, for example, the type of blast furnace gas burning facility is not limited to the above gas turbine facility (power generation facility) but may be another type of blast furnace gas burning plant. In the present invention, additionally, the mixing of coke oven gas (COG) is not essential. In addition, the calorie-increasing gas used is not limited to coke oven gas (COG) but may be another type of gas. In addition, the wet type dust collector 7 and the fuel gas compressor 8 are not limited to the wet electrostatic dust collector and the constant volume axial compressor, respectively, described above; naturally, other types of dust collectors and compressors may be used.

The invention claimed is:

1. In a blast furnace gas burning facility that burns blast furnace gas discharged from a blast furnace by supplying the blast furnace gas to a combustor, the facility comprising:
    a wet dust collector to remove dust contained in supplied gas supplied to the facility;
    a fuel gas compressor, to compress gas from the wet dust collector to supply compressed gas to the combustor;
    a line to partially divert excess gas from the fuel gas compressor and to supply the excess gas to the wet dust collector after cooling the excess gas; and
    a fuel-gas heating line to partially divert and to supply the compressed gas to the wet dust collector if the temperature of the supplied gas is a predetermined temperature or below.

2. In a method for operating a blast furnace gas burning facility that burns blast furnace gas, the method comprising:
    removing dust contained in supplied gas supplied to the facility with a wet dust collector;
    compressing the gas with a fuel gas compressor;
    supplying the compressed gas to a combustor; and
    partially diverting the compressed gas to the wet dust collector to heat the supplied gas flowing into the wet dust collector if the temperature of the supplied gas flowing into the wet dust collector is a predetermined temperature or below, thereby maintaining the temperature of the supplied gas flowing into the wet dust collector at or above a freezing lower-limit temperature.

3. The method for operating the blast furnace gas burning facility as described in claim 2, wherein the amount of diverted gas is controlled by detecting the temperature of gas supplied to the facility and is subjected to feedforward control by detecting the flow rate of the supplied gas.

* * * * *